United States Patent [19]

Long et al.

[11] 4,396,175
[45] Aug. 2, 1983

[54] TRACK FITTING

[75] Inventors: William A. Long, Harwinton; Ward E. Fischer, Torrington; Rene J. Brunelle, Wolcott, all of Conn.

[73] Assignee: UOP Inc., Des Plaines, Ill.

[21] Appl. No.: 214,392

[22] Filed: Dec. 8, 1980

[51] Int. Cl.³ .............................................. A47B 97/00
[52] U.S. Cl. ............................... 248/503.1; 244/118.6; 410/105; 410/115
[58] Field of Search ...................... 248/503.1, 503, 429, 248/501; 410/105, 79, 69, 94, 116, 115, 108, 104; 244/118.6

[56] References Cited

U.S. PATENT DOCUMENTS

| | | | |
|---|---|---|---|
| 3,570,415 | 3/1971 | Drinnon et al. | 410/115 X |
| 3,677,195 | 7/1972 | Prete | 410/105 |
| 4,064,811 | 12/1977 | Copeland | 410/116 X |
| 4,114,947 | 9/1978 | Nelson | 248/503.1 X |
| 4,277,043 | 7/1981 | Weik | 248/503.1 |

Primary Examiner—William H. Schultz
Assistant Examiner—Ramon O. Ramirez
Attorney, Agent, or Firm—James R. Hoatson, Jr.; Barry L. Clark; William H. Page, II

[57] ABSTRACT

An improved track fitting for anchoring an aircraft seat to a seat track has a threaded "anti-rattle" fastener for forcing a flanged top portion of a movement restricting shear pin against the top of the seat track to prevent rattle and wear due to aircraft vibrations. A pivoted lever which also functions as a cover for the fitting is mounted on the body of the fitting for lifting the shear pin against the force of a shear pin spring which normally urges the pin into locking engagement with one of the slots in a seat track. To prevent tampering by a passenger, the lever is rendered inoperable when the anti-rattle fastener is actuated. A leaf spring carried by the lever engages the body and prevents the lever from rattling due to vibration. The lever can lock the shear pin in its upper disengaged position as the seat fitting is lowered into the seat track and can then be released so that the shear pin will drop into one of the slots in the seat track automatically as the fitting is moved fore or aft.

5 Claims, 7 Drawing Figures

TRACK FITTING

BACKGROUND OF THE INVENTION

The invention relates to track fittings and particularly to fittings used to attach the rear legs of aircraft seats to slotted seat tracks in the floor. Such fittings typically include a pair of spaced stud portions which are adapted to enter the track through wide openings and then be slid fore or aft by a distance equal to one-half the distance between the centers of the studs so they will underlie retaining lips on the track. A shear pin is also mounted on the fitting and is movable vertically so that it will be above the seat track when the stud portions are dropped into the wide slotted openings in the track and can be lowered into one of the wide openings after the stud portions are slid under the track lips by a distance of one-half the distance between a pair of openings. To prevent rattling of the fitting, it is known to provide various types of threaded fasteners which will move one portion of the fitting relative to other portions such that one or more portions will be forced into tight frictional contact with a portion of the seat track. In some fittings it is possible for the shear pin to be lifted and disengaged even though the anti-rattle fastener is still engaged. This type of fitting could permit the seat to appear to be firmly anchored to the floor, but would, of course, easily fail in a crash situation. The situation is especially serious with respect to those fittings in which the shear pin is at the rear of the fitting where it would be accessible to a curious passenger who might lift the pin from its detented locked position and leave it in its upper unlocked position. Since the anti-rattle fastener must be accessible to a seat installer, it is often directed to the rear where it can be unsightly to a passenger or where a separate cover member must be provided.

SUMMARY OF THE INVENTION

It is among the objects of the present invention to provide a track fitting which will overcome all of the disadvantages of the hereinabove discussed prior art devices and will provide many previously unavailable advantages as noted in the Abstract. An additional advantage is that the lever which actuates the shear pin is preferably formed in a curved manner such that it smoothly recesses into a rearwardly extending portion of a uniquely designed seat leg structure with which the improved fitting may be used.

The improved fitting basically comprises a body portion having a pair of spaced stud portions extending downwardly on its bottom and an aperture at its upper forward corner by which it is pivotally pinned to a seat leg member. A shear pin is mounted for vertical movement in a vertical open portion between the stud portions and has a spring positioned in the space above its upper surface for urging it downwardly. A lever member has an extended curved upper actuator portion by which it is actuated and a pair of lower arm portions which straddle the sides of the body portion and are pivotally pinned to the top of the shear pin. A cam portion extending from an intermediate point on the lower side of each arm portion contacts the upper corner of a projection on the body portion and rocks and slides relative to it as the lever actuator portion is moved down so as to lift the shear pin. As the lever actuator approaches its extreme downward position, the pinned ends of the arm portions move over-center and cause the cam portions to first slide off the projections and then resiliently wedge against and engage the forward facing side of the projection under the force of the shear pin spring which is now substantially fully compressed. In this position, the shear pin is firmly locked in its upper disengaged position so that the seat can be easily assembled to the floor track and moved so that the stud portions are slid under the lips on the seat track to their approximate final position. At this point, the actuator portion may be lifted to disengge the over-center locking of the cam portion and permit the shear pin spring to urge the shear pin downwardly into one of the seat track slots as soon as it becomes aligned with it due to further fore and aft movement of the seat. Portions of the forward surface of the fitting are formed to cooperate with portions of the seat leg and of the track cover to permit the fitting to be preassembled to the seat in such a manner that it will remain generally level as the seat is handled before assembly to the seat track.

DESCRIPTION OF THE PREFERRED EMBODIMENT

Figure 1:
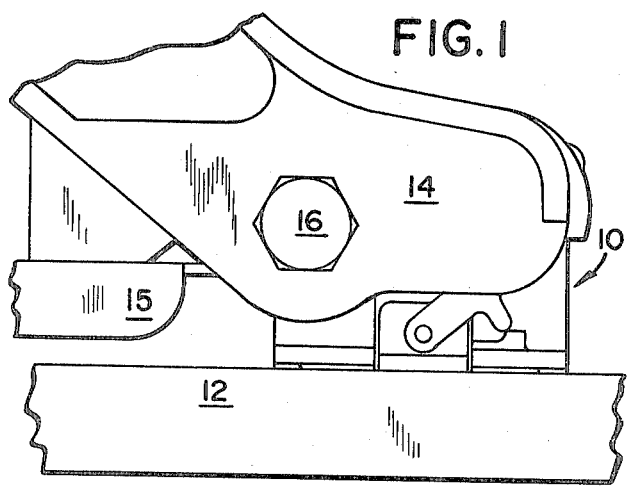
FIG. 1 is a side view illustrating the relationship between a rear seat leg, a seat retaining track and the track fitting of the present invention.

Referring to FIG. 1, the improved track fitting assembly is indicated generally at 10 in its operative relationship with a seat track 12 and a rear seat leg 14 which is affixed to the fitting 10 by a bolt 16.

Figure 2:
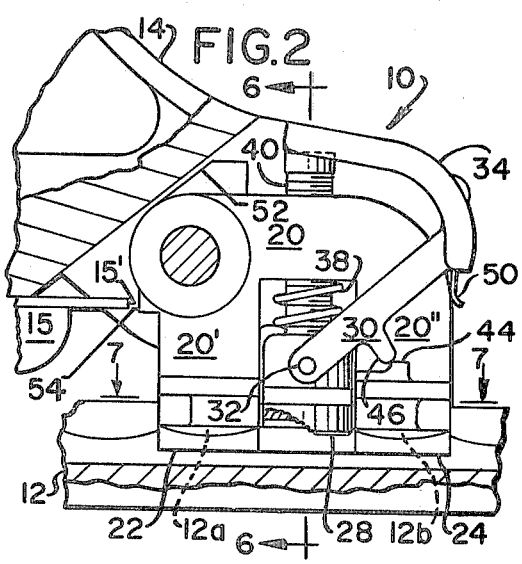
FIG. 2 is the same view as FIG. 1, but with portions of the leg and seat track broken away.
Figure 6:
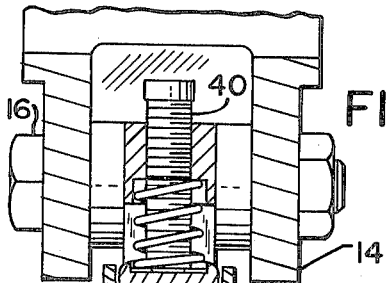
FIG. 6 is a view taken on line 6—6 of FIG. 2.
Figure 7:
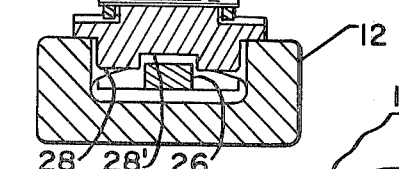
FIG. 7 is a view taken on line 7—7 of FIG. 2.
Figure 7:
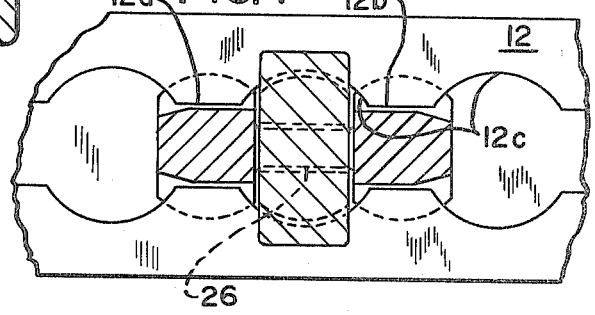

In FIG. 2, portions of the seat track 12 and seat leg 14 are removed so as to show the relationships between the internal portions of the leg, the track cover 15 which is bolted to the front and rear legs, the seat track and the track fitting. The track fitting has a body portion 20 which may, for example, be made as a stainless steel investment casting. The body portion includes a forward or leading end leg portion 20' and a rearward or trailing end leg portion 20" which are formed at their lower ends so as to include respectively, a forward flanged stud portion 22 and a rearward flanged stud portion 24. To increase the strength of the fitting, the stud portions 22, 24 are preferably connected by an integral web portion 26 which is of a limited height and which, in the operative position of the fitting, is accommodated within a recess 28' within the movable shear pin 28 as shown in FIG. 6. As best seen in FIG. 2, the shear pin 28 is adapted to move vertically in the opening defined by the leg portions 20', 20" and is retained against sidewise movement out of the opening due to its being pivotally mounted to spaced arms 30 which are pinned to the shear pin 28 by a roll pin 32. The arms 30 are joined at their other ends either by being welded to the actuating lever member 34 or by being formed integrally therewith. A spring 38 is retained within the opening between the leg portions 20', 20" by the anti-rattle fastener member 40 and functions so as to urge the shear pin 28 downwardly toward its operative position shown in FIG. 2. In this operative position, the shear pin is positioned within the opening 12c (FIG. 7) in the seat track 12 after the studs 22, 24 have been first dropped through an adjacent pair of openings 12c and then moved fore or aft one-half the distance between adjacent openings 12c so as to be retained under the seat track lip portions 12a, 12b.

Figure 3:
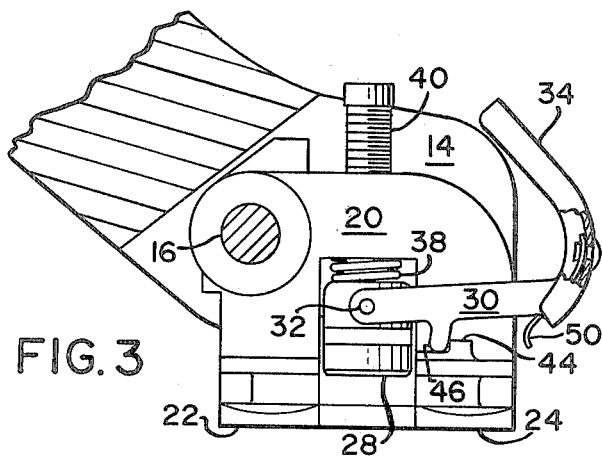
FIG. 3 is a side view of the track fitting in its disengaged position.
Figure 4:
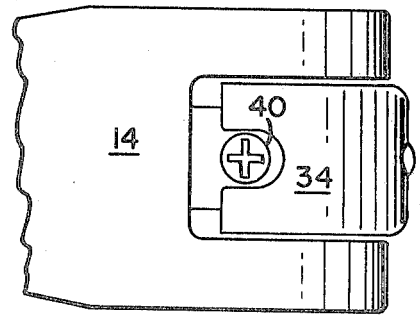
FIG. 4 is a top view of the track fitting and associated leg in the engaged position shown in FIG. 1.

To either mount or unmount the fitting 10 relative to a seat track 12, the anti-rattle fastener screw 40 must be unscrewed from its FIG. 2 locked position wherein it bears down on the upper end of shear pin 28 to the relieved position shown in FIG. 3 wherein downward movement of the actuating lever 34 in a rocking movement about the projection 44 on the rear leg 20'' will cause the shear pin to be lifted. During the lifting movement, the cam portion 46 of the arm 30 which engages the forward corner of the horizontal contact surface of the projection 44 will slip down along the forward vertical contact surface of the projection as shown in FIG. 3 and provide somewhat of an over-center locking arrangement. In the operative position shown in FIG. 2, a leaf spring 50 attached to the actuating lever 34 will contact the body portion 20 and prevent any vibration of the lever 34 from taking place.

Figure 5:
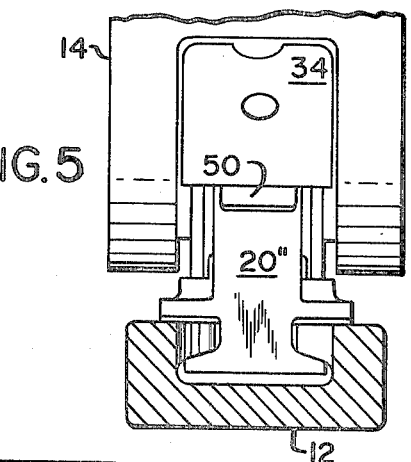
FIG. 5 is a view taken from the right end of FIG. 1.

As can be seen in FIGS. 2 and 3, the lever 34 is positioned in a recessed area of the rear seat leg 14 when in its operative position and functions as a decorative cover for the recess and the fitting. In the operative position the lever 34 has no accessible portions which a passenger could actuate to release the fitting. A tool such as a screwdriver would have to be used in the space (FIG. 5) between the top of lever 34 and the portion of the leg 14 above it to initiate movement of the lever. However, no movement of lever 34 can take place until the screw 40 is moved upwardly from the locked position shown in FIG. 2 where it contacts shear pin 28 to the unlocked position of FIG. 3. This is so since arm 30 rocks about cam surface 46 and has its inner end pinned to the shear pin 28.

A particular advantage of the invention is that the fitting can anchor itself in the seat track. With the shear pin lifted as shown in FIG. 3, the fitting is inserted in a seat track 12 and the studs 22,24 are slid partially under retaining lip portions 12a, 12b. The lever 34 is then lifted just enough to release the cam 46 from locking engagement with projection 44. As soon as the seat and fitting are slid fore or aft, a sufficient amount to permit the shear pin 28 to be aligned with opening 12c, the force of spring 38 will snap the pin 28 downwardly into the opening and lift the lever to its FIG. 2 position. If the lever 34 is lifted all the way to its upper position before the pin 28 is aligned with opening 12c, it will be located above the leg 14. This is a safety feature since it permits one to determine visually that firm locking has not yet taken place. Presence of the screw 40 above the top surface of the leg 14 also gives a visual indication that the anti-rattle feature is not engaged. As seen in FIG. 2, integral projections 52,54 are preferably formed on the body 20. These projections cooperate, respectively, with the leg 14 and a tab 15' on the track cover member 5 to limit rotation of the fitting 10 relative to the leg 14 and thus enable the fitting and seat to be easily assembled as a unit to the seat track 12.

We claim as our invention:

1. A track fitting for anchoring a seat to a seat track in the floor of an aircraft comprising a body member having a pair of downwardly depending stud portions adapted to underlie retaining lip portions of a seat track, an open area between said stud portions, a shear pin mounted for vertical movement in said open area from a downward operative position to an upward inoperative position, a spring for normally urging said shear pin downwardly into said open area, a manually actuable lever member having a pair of arm portions integral therewith, and straddling the sides of said body member, the outer ends of said arm portions being pivotally attached to said shear pin, a downwardly projecting cam portion intermediate the ends of said arm portions, a pair of contact portions on said body portion having contact surfaces which are adapted to be progressively engaged by said cam portions in a sliding fulcrum fashion when said lever member is actuated downwardly to lift the shear pin against the force of said spring from its operative position to its inoperative position.

2. A track fitting according to claim 1 wherein each of the contact portions on said body portion has a generally horizontal contact surface which is engaged by one of said cam portions during the initial lifting of the shear pin and a generally vertical contact surface which is engaged when said shear pin reaches its inoperative position.

3. A track fitting according to claim 2 wherein the transition between the generally horizontal and generally vertical contact surface is very abrupt and produces an over-center locking of the shear pin as a side portion of the cam portion slides off the generally horizontal contact surface and onto the generally vertical contact surface.

4. A track fitting according to claim 1 wherein a threaded locking member is mounted in said body member for generally vertical movement into and out of contact with said shear pin, said locking member in its downward engaged position, causing said body member to be lifted relative to said shear pin so as to eliminate rattling between the fitting and a seat track to which it is mounted.

5. A track fitting according to claim 4 wherein movement of said locking member to its engaged position locks said shear pin in its operative position and prevents any downward movement of said lever member.

* * * * *